United States Patent
Gao

(10) Patent No.: US 11,271,259 B2
(45) Date of Patent: Mar. 8, 2022

(54) AIRFLOW MANAGEMENT FOR BATTERY MODULE COOLING

(71) Applicant: Baidu USA LLC, Sunnyvale, CA (US)

(72) Inventor: Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 88 days.

(21) Appl. No.: 16/560,915

(22) Filed: Sep. 4, 2019

(65) Prior Publication Data

US 2021/0066766 A1  Mar. 4, 2021

(51) Int. Cl.
*H01M 10/48* (2006.01)
*H01M 10/6561* (2014.01)
*H01M 10/613* (2014.01)
*H01M 10/625* (2014.01)

(52) U.S. Cl.
CPC ....... *H01M 10/482* (2013.01); *H01M 10/613* (2015.04); *H01M 10/6561* (2015.04); *H01M 10/625* (2015.04)

(58) Field of Classification Search
CPC ......... H01M 10/6561; H01M 10/6562; H01M 10/6563; H01M 10/6564; H01M 10/6566
See application file for complete search history.

(56) References Cited

U.S. PATENT DOCUMENTS

| | | | | |
|---|---|---|---|---|
| 5,035,964 A * | 7/1991 | Levinson | .......... | H01M 10/6551 429/120 |
| 8,560,677 B2 * | 10/2013 | VanGilder | ............. | G06F 9/5094 709/224 |
| 8,951,655 B2 * | 2/2015 | Chung | ................ | H01M 10/617 429/72 |
| 9,823,715 B1 * | 11/2017 | Roy | .................... | H05K 7/20745 |
| 9,973,032 B2 * | 5/2018 | Malone | ..................... | H02J 7/00 |
| 10,206,313 B1 * | 2/2019 | Gold | ..................... | H05K 7/1491 |
| 10,664,365 B2 * | 5/2020 | Gow | ................... | H01M 10/482 |
| 10,727,553 B1 * | 7/2020 | Gao | ................... | H05K 7/20781 |
| 2007/0227710 A1 * | 10/2007 | Belady | ................. | H05K 7/2079 165/122 |
| 2009/0268404 A1 * | 10/2009 | Chu | ................... | H05K 7/20836 361/696 |
| 2010/0319883 A1 * | 12/2010 | Facusse | ............ | H05K 7/20818 165/104.26 |
| 2012/0116590 A1 * | 5/2012 | Florez-Larrahondo | ...................... | G06F 1/206 700/275 |

(Continued)

*Primary Examiner* — Amanda C. Walke
(74) *Attorney, Agent, or Firm* — Womble Bond Dickinson (US) LLP

(57) ABSTRACT

According to one embodiment, a battery module includes a battery cell chamber that includes a set of battery cells configured to provide battery energy to a load and are configured to draw power from an external power supply to charge the battery cells. While the set of battery cells provide the battery energy or draw power, the cells generate heat. The module also includes an air supply chamber that is configured to supply air into the battery cell chamber, where the supplied air flows through the battery cell chamber and absorbs the heat generated by the battery cells to cool the battery cells. Thus, the airflow is supplied to the air supply chamber and being distributed evenly to the cells, and may exist the module through an air exhaust chamber after extracting the heat from the cells. Fans may be used for pushing/pulling airflow through the module.

20 Claims, 11 Drawing Sheets

(56) References Cited

U.S. PATENT DOCUMENTS

| | | | |
|---|---|---|---|
| 2012/0218711 A1* | 8/2012 | Kashirajima | F25B 25/00 |
| | | | 361/700 |
| 2014/0277819 A1* | 9/2014 | Mick | G06F 1/324 |
| | | | 700/300 |
| 2016/0157388 A1* | 6/2016 | Belady | G06F 1/26 |
| | | | 700/282 |
| 2017/0229747 A1* | 8/2017 | Jung | H01M 10/6567 |
| 2018/0123200 A1* | 5/2018 | Golubkov | H01M 10/6566 |
| 2019/0081289 A1* | 3/2019 | Takabayashi | H01M 10/6553 |
| 2021/0104788 A1* | 4/2021 | Shao | H01M 10/627 |

* cited by examiner

AIRFLOW MANAGEMENT FOR BATTERY MODULE COOLING

FIELD

Embodiments of the present disclosure relate generally to airflow management for cooling a battery module. More particularly, embodiments of the disclosure relate to a battery module that utilizes an air supply chamber to distribute air across battery cells of the module to cool the cells.

BACKGROUND

Lithium-ion batteries are commonly used in the vehicle industry, for example, electric vehicles (EVs) and plug-in hybrids. Lithium-ion battery packs for electric vehicles are designed for vehicle specific requirements and usage. Lithium-ion batteries, however, are also becoming popular in the data center space and attracting much attention from the industry.

Large clusters of computer servers can be kept in dedicated facilities, often in a rack enclosure. The servers can be used in support of the data center industry. Use of a battery backup unit (BBU) in place of traditional solutions, such as lead-acid based Uninterruptible Power Supply (UPS) systems, has grown in popularity. One result of the BBU's new role in the data center space is the relocation of the BBU from a centralized battery room to a data center IT room. Thermal environment (e.g., temperature and airflow) in the data center is generally managed and operated based on specifications and requirements of the servers, not batteries, or not ideal for batteries.

Conventionally, the data center industry cools rack enclosures using an air-based cooling system. To air cool, rack enclosures may draw cold air from a "cold aisle", through the use of fans within the enclosure. Through convection, heat is transferred from electronics within the enclosure to the cold air, thereby heating the air. This hot air is then expelled into a "hot aisle" that is isolated from the cold isle. In some cases, the hot aisle may be connected to a computer room air conditioning (CRAC) unit that cools the hot air and circulates it back to the cold aisle. As another example, the rack may include cooling units, such as fans that draw in the cool air from the cold isle.

These systems, however, may not be effective when used to cool BBUs. For example, an air path through a pack in the rack enclosure may be relatively long with a large thermal gradient. As a result, cold air may not sufficiently cool a distal portion of the BBU (with respect to an inlet through which the cold air enters the enclosure) with respect to a proximal portion of the BBU. Thermal overshoot of the BBU (or battery cells within the BBU) may occur if the BBU is not in a proper thermal environment, which may result in a reduction to BBU performance and life. Therefore, there is a need for airflow management that evenly cools batteries in order to maintain battery performance.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
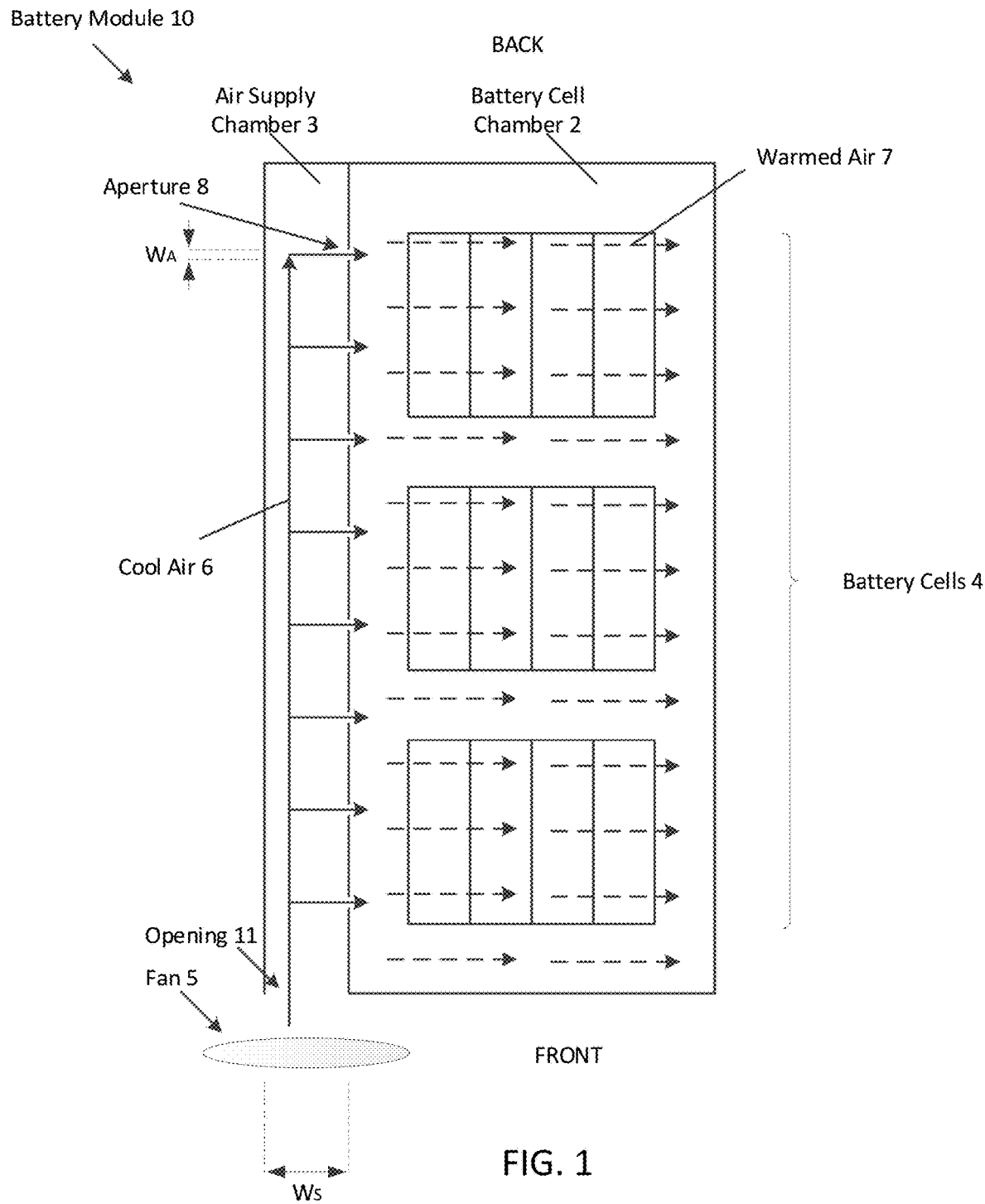
FIG. 1 is a block diagram illustrating an example of a battery module that includes an air supply chamber and a battery cell chamber according to one embodiment.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of the each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, a battery module includes a battery cell chamber that includes a set of battery cells configured to provide battery energy to a load and are configured to draw power from an external power supply to charge the battery cells. While the set of battery cells provide the battery energy or draw power, the battery cells generate heat. The module also includes an air supply chamber that is configured to supply air into the battery cell chamber. The supplied air flows through the battery cell chamber and absorbs the heat generated by the battery cells to cool the battery cells.

In one embodiment, the battery module also includes at least one fan that is configured to push the air into the air supply chamber in order for the air supply chamber to supply the air into the battery cell chamber. In another embodiment, the fan is at a first end of the air supply chamber, and the air supply chamber includes a first side that is adjacent to the battery cell chamber and a second side that is not adjacent to the battery cell chamber. The first side of the air supply chamber tappers away from the battery cell chamber and towards the second side of the air supply chamber so that a width of the first end is greater than a width of a second end of the air supply chamber that is opposite to the first end.

In one embodiment, the air supply chamber includes several apertures, through which the air is supplied into the battery cell chamber. In another embodiment, the air supply chamber includes an opening through which air is pushed into the air supply chamber by the fan. The opening has a first width and each of the apertures has a second width that is less than the first width. Thus, each of the apertures has a reduced cross-sectional area than the opening. Since the apertures are smaller than the opening, they are configured to supply the air into the battery cell chamber at a higher air flow rate (e.g., velocity) than an air flow rate at which the fan pushes the air through the opening, which is based on the continuity equation $Q=A_1V_1=A_2V_2$, where Q is the volumetric flow rate, A is the cross sectional area of flow, and V is the mean velocity.

In one embodiment, the battery module further includes an air exhaust chamber that is configured to receive warmed air from the battery cell chamber, where the warmed air is produced when the air absorbs the heat from the battery cells. In another embodiment, the battery module further includes at least one fan that is configured to pull the warmer air from the battery cell chamber and into the air exhaust chamber in order to expel the warmer air. In some embodiments, the air supply chamber is on a first side (e.g., the left side) of the battery cell chamber and the air exhaust chamber is on a second side (e.g., the right side) of the battery cell chamber that is opposite of the first side. Thus, each of the chambers may be positioned next to one another. In another embodiment, however, the chambers may be stacked on top of one another. For example, the air supply chamber, which is supplying the air may be on the bottom of the stack. The battery cell chamber may be in the middle, and since warmed air naturally raises the air exhaust chamber may be at the top.

In one embodiment, the set of battery cells includes a first row of one or more battery cells and a second row of one or more battery cells, where the first and second rows are one of 1) centered with one another or 2) off-centered with one another.

In another embodiment, the battery module comprises a cooling module that includes the battery cell chamber and the air supply chamber and a cell module that includes the set of battery cells. The battery module is removeably coupled to the cell module, and the set of battery cells are enclosed within the battery cell chamber when the cooling module is coupled to the cell module.

According to another embodiment, a battery backup unit (BBU) shelf of an electronic rack that includes several server blades, each server blade including one or more servers to provide data processing services, where the BBU shelf is coupled to the server blades and is configured to provide backup power. The BBU shelf includes one or more battery modules that is similar to the battery module as previously described.

In one embodiment, the BBU shelf further includes at least one of 1) at least one fan that is configured to push air into an air supply chamber of each battery module to supply air into a battery cell chamber of each battery module and 2) at least one fan that is configured to pull warmer air from the battery cell chamber that is produced when the supplied air absorbs heat generated by battery cells of the battery cell chamber of each battery module into an air exhaust chamber of each battery module in order to expel the warmer air.

In another embodiment, each battery module further includes at least one fan that is configured to push the air into the air supply chamber to supply air into the battery cell chamber, where the BBU shelf further includes at least one fan that is configured to pull the warmer air from the battery cell chamber of each battery module into the air exhaust chamber of each battery module in order to expel the warmer air.

As described, conditions and requirements of a BBU in an IT rack, data center, and/or IT room environment are different from conditions and requirements of a battery pack in an electrical vehicle application. For example, thermal environments are different, and the discharging and charging cycles occur much less in the data center application scenario than in the electrical vehicle application.

Cooling batteries, which generate heat during discharging and charging cycles can be critical because nominal battery performance is typically specified for working temperatures ranges of battery cells (e.g., 25° C. to 35° C.). Temperature also plays an important role with respect to battery aging. Temperatures outside of the working range may result in reduced performance and negatively impact battery health. In addition, when multiple battery cells are connected, there can be large internal differences between different cell temperatures, which can lead to different charge and discharge rates for each cell and deteriorate performance of the battery pack. Importantly, if battery temperature exceeds safety thermal limits, this can cause extreme damage or harm, even catastrophic results. Thus, cooling schemes (or methods) are important considerations in the design and operation of a battery because improper cooling may not only impact how a battery performs, but also the health, the lifetime, and the safety of the battery.

Embodiments of the present disclosure provide an airflow management solution that evenly and efficiently air-cools batteries cells of a battery module. In one embodiment, the battery module includes a battery cell chamber that includes a set of battery cells and an air supply chamber that is configured to supply air into the battery cell chamber. When the cells charge or discharge, thermal energy generated by one or more of the battery cells is absorbed by (or transferred into) the supplied air that flows through the battery cell chamber, thereby cooling the cells (and producing warmer air than the supplied air). In such a manner, the battery module uses forced convection to evenly cool the battery cells within the battery module. It should be mentioned that the phrase "battery pack" may be used herein interchangeably with "battery backup unit module (BBU module)" and with "BBU pack". Also, a BBU may include one or more battery modules (or battery packs). A battery module may include several battery cells. Other features are also described in the following examples.

FIG. 1 shows a block diagram illustrating an example of a battery module that includes an air supply chamber and a battery cell chamber according to one embodiment. Specifically, this figure shows a top-down cross-sectional view of a battery module 10 that includes a battery cell (cell or first) chamber 2 and an air supply (or second) chamber 3 that is to a side (e.g., a left side) of the cell chamber 2. In one embodiment, the module may have any shape and configuration. For example, as illustrated, the battery module is a rectangular box. In other embodiments, however, the module may be a square box or a cylinder, for example.

The cell chamber includes battery cells 4 (e.g., three groups of four battery cells) that may be series connected, parallel connected, or a combination thereof. The battery cells may be of any type, such as Lithium-ion, Nickel Cadmium, etc. The battery cells are configured to provide battery energy stored within the cells to a load (e.g., the load may be at least one server as described herein), and are configured to draw power from an external power supply (or source) to charge the cells. In one embodiment, rather than including multiple battery cells, the module may include only one battery cell.

As illustrated, the air supply chamber 3 includes an opening 11 (at a front of the module) that is configured to receive cool air from a fan 5. In one embodiment, the opening 11 may be in any position (e.g., at a side of the module, at a back of the module, etc.). In one embodiment, the fan may be positioned at (or next to) the opening of the chamber 3. In another embodiment, there may be two or more fans at (or near) the opening of the air supply chamber. As described herein, the fan 5 may be a part of the battery module or separate from the battery module. For example, the fan may be a part of a fan module that is removeably coupled (e.g., via a duct) to the battery module. In another example, the fan may be a part of a data-center cooling system, such as a CRAC unit. For instance, the cool air may be supplied (e.g., via a duct) to the air supply chamber 3 by (e.g., a fan of) the CRAC unit.

As described herein, during operation of the battery module (e.g., while the battery cells 4 are discharging/charging), heat may be generated by the cells inside the cell chamber 2. To cool the battery cells, the fan 5 is configured to push cool air 6 through the opening 11 and into the air supply chamber 3. This cool air 6 is pushed through several (e.g., eight) apertures 8 (openings or holes) into the cell chamber 2. The cool air that enters the cell chamber through the apertures travels through the cell chamber, absorbing the generated heat through forced convection. Specifically, the cool air is pushed towards the battery cells and comes into contact with the hot (or heated) surface of the cells. Since the air is cooler than the surface, heat is exchanged thereby producing warmed air 7 (e.g., air that is warmer than the cool air 6) and cooler (or cooled) cells.

In one embodiment, there may be more (or less) apertures. For example, in this figure, there are eight apertures that are supplying air that is being pushed up against and over the battery cells 4. As another example there may be multiple rows of apertures, each row at a different height in order to evenly distribute the air into the cell chamber 2.

In one embodiment, the cool air 6 inside the air supply chamber 3 may be at a higher pressure than the air (e.g., warmer air 7) in the cell chamber 2. In some embodiments, to maintain a higher pressure, the opening 11 at which cool air is supplied into the air supply chamber 3 may have a first width, $W_S$, and each of the apertures through which the cool air is pushed into the cell chamber 2 may each have a second width, $W_A$, which is less than the first width. As a result of the cool air being at a higher pressure, the apertures are configured to supply the cool air into the cell chamber at a higher air flow rate (or velocity) than an air-flow rate at which the fan 5 pushes the cool air through the opening 11. By pushing the cool air into the cell chamber 2 at a high velocity, heat transfer by convection may be increased, thereby cooling the battery cells more efficiently and/or more rapidly. In one embodiment, the battery module 10 may include vents that allow the warmed air to exit the module. Specifically, the battery cell chamber 2 may include one or more vents or perforated openings on a side that is opposite of the air supply chamber 3 and/or may include vents or perforated openings at a back of the chamber.

In one embodiment, the supply chamber 3 may be positioned to (better) evenly cool the battery cells 4. In conventional air cooling systems, fans may be positioned at a front (or back) of an electronic device (or battery), where air is pushed from the front towards the back. In the case of a battery, although this may efficiently cool battery cells that are closer to the front, cells to the back, however, will not be cooled as efficiently. As a result, there will be a large thermal gradient between the cooler cells at the front and the warmer cells to the back. Cells with different internal temperatures may adversely affect performance. In the present disclosure, the air supply chamber 3 is positioned on a (e.g., left) side of the cell chamber 2. In one embodiment, the air supply chamber 3 may be positioned on any side of the chamber (e.g., a right side). The chamber 3 evenly supplies (or distributes) cool air 6 from one side of the cell chamber 2 towards another. By supplying the air on the side, the cells may be evenly cooled because the cool air may come into contact with more surface area of the battery cells, and the air may have a shorter distance to travel (with respect to front to back of the module) since the module is of a rectangular shape.

Figure 2:
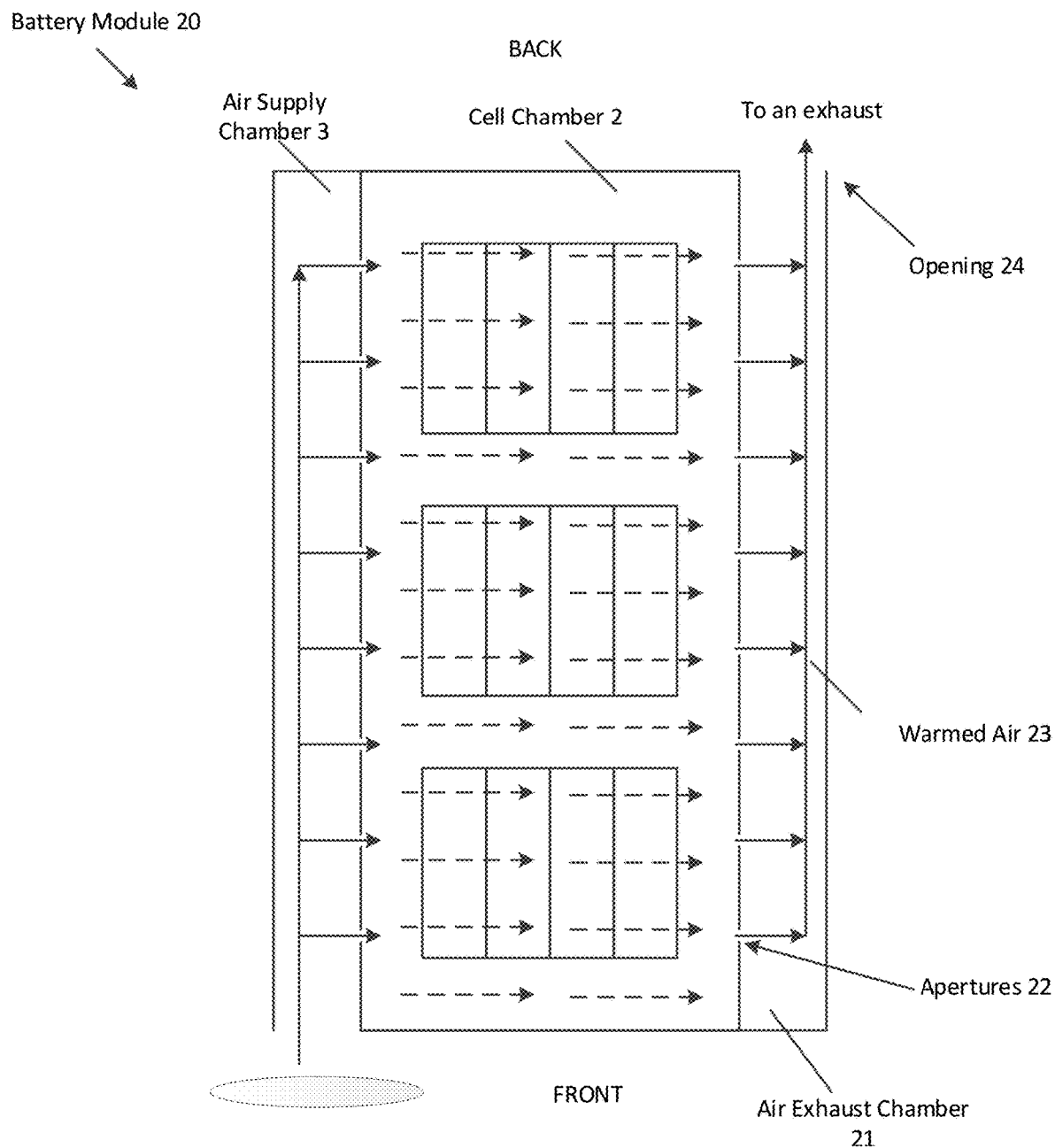
FIG. 2 is a block diagram illustrating an example of a battery module that includes multiple air chambers according to one embodiment.

FIG. 2 shows a block diagram illustrating an example of a battery module that includes multiple air chambers according to one embodiment. Specifically, this figure shows battery module 20 that includes the cell chamber 2, the air supply chamber 3, and an air exhaust (or third) chamber 21. As illustrated, the air supply chamber 3 is on a first (e.g., left) side of the cell chamber 2 and the air exhaust chamber 21 is on a second (e.g., right) side of the cell chamber 2. The air exhaust chamber 21 is configured to receive (or draw) warmed air 23 from the cell chamber 2 (via apertures 22), where the warmed air is produced when the cool air that is supplied to the cell chamber 2 by the air supply chamber 3 absorbs the heat generated by the battery cells. The warmed air 23 that is received by the chamber 21 may be expelled out of the battery module through an opening 24 to an exhaust. In some embodiments, the battery module 20 may be coupled to an external exhaust via ducts, or the exhaust may be coupled thereon. In another embodiment, the warmed air 23 may just be expelled out of the battery module through the opening 24 into the environment (e.g., a hot aisle of a database center in which the battery module is located).

In one embodiment, the air supply chamber 3 and air exhaust chamber 21 may be the same size (e.g., width). In another embodiment, the chambers may be sized differently. In some embodiments, the air exhaust chamber 21 may have a same or different number (and/or size) of apertures than the apertures of the air supply chamber 3.

Figure 3:
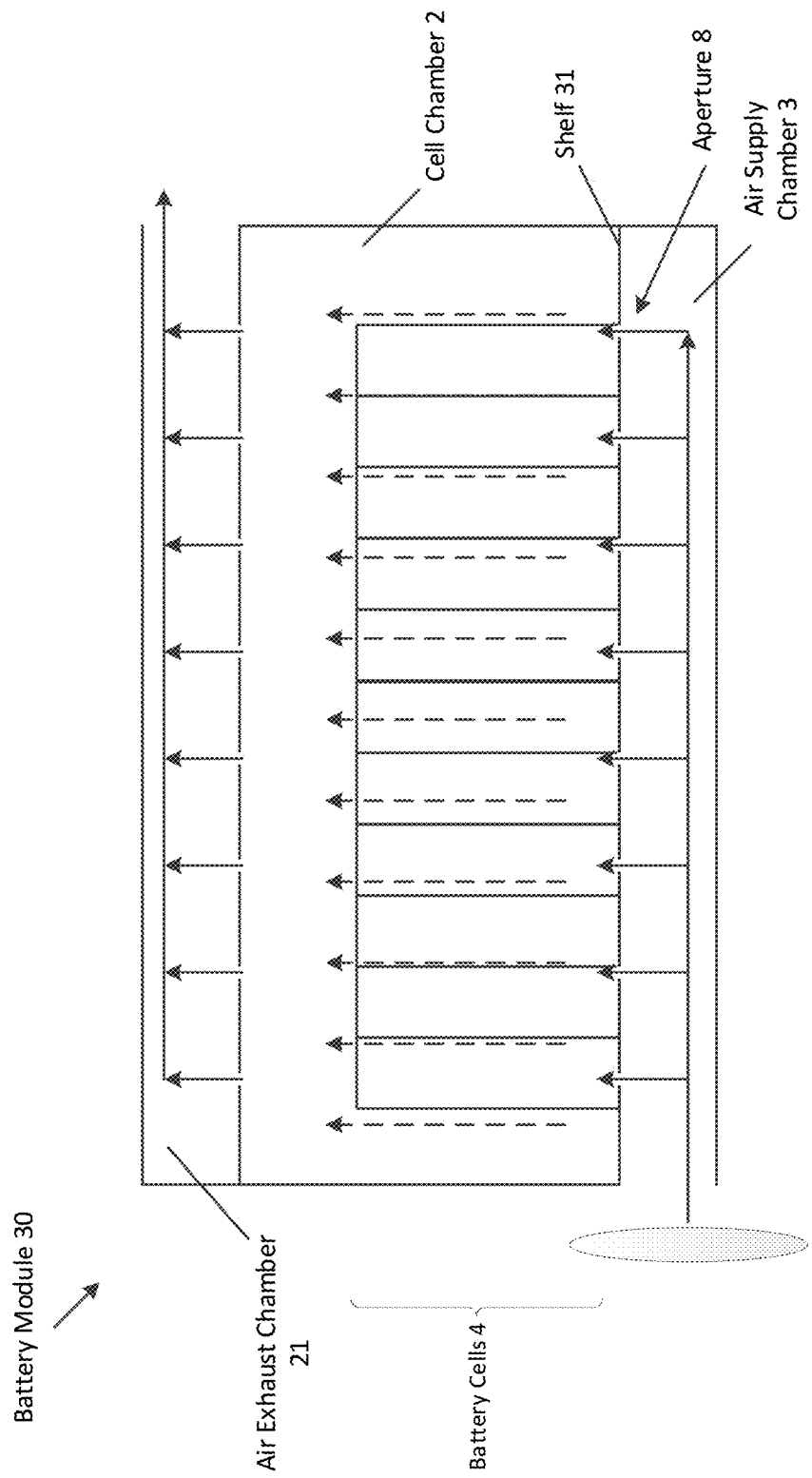
FIG. 3 is a block diagram illustrating an example of another battery module according to one embodiment.

FIG. 3 shows a block diagram illustrating an example of another battery module according to one embodiment. Specifically, this figure shows a profile view of a cross section of a battery module 30 with the air supply chamber 3, the cell chamber 2, and the air exhaust chamber 21 each stacked on top of one another. As illustrated, the battery cells 4 are sitting on a shelf 31 that separates the cell chamber 2 from the supply chamber 3. During operation, the air supply chamber 3 supplies cool air through the apertures 8 in the shelf 31. The cool air travels upward and when doing so absorbs the heat generated by the battery cells 4 to produce warmed air. The warmed air then continues to travel upward and into the air exhaust chamber 21 to be expelled from the module 30.

Figure 4A:
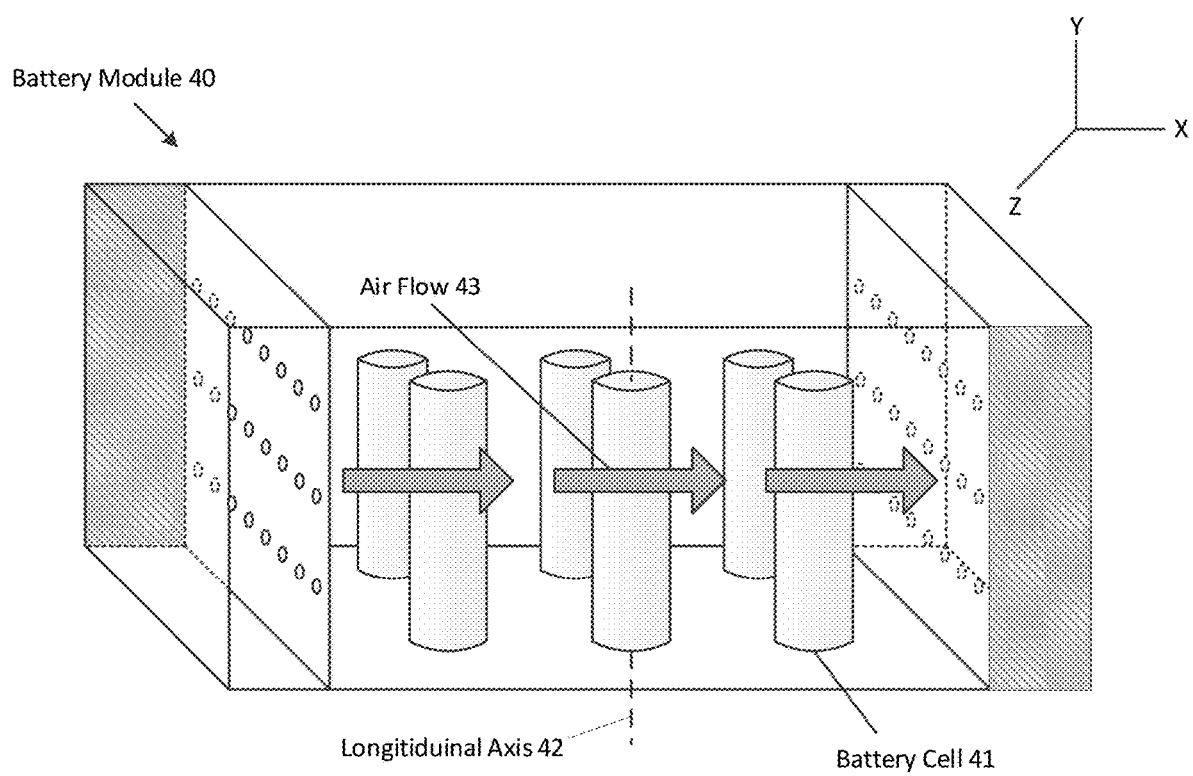
FIGS. 4a and 4b are block diagrams illustrating different examples of battery cell arrangements according to one embodiment.
Figure 4B:
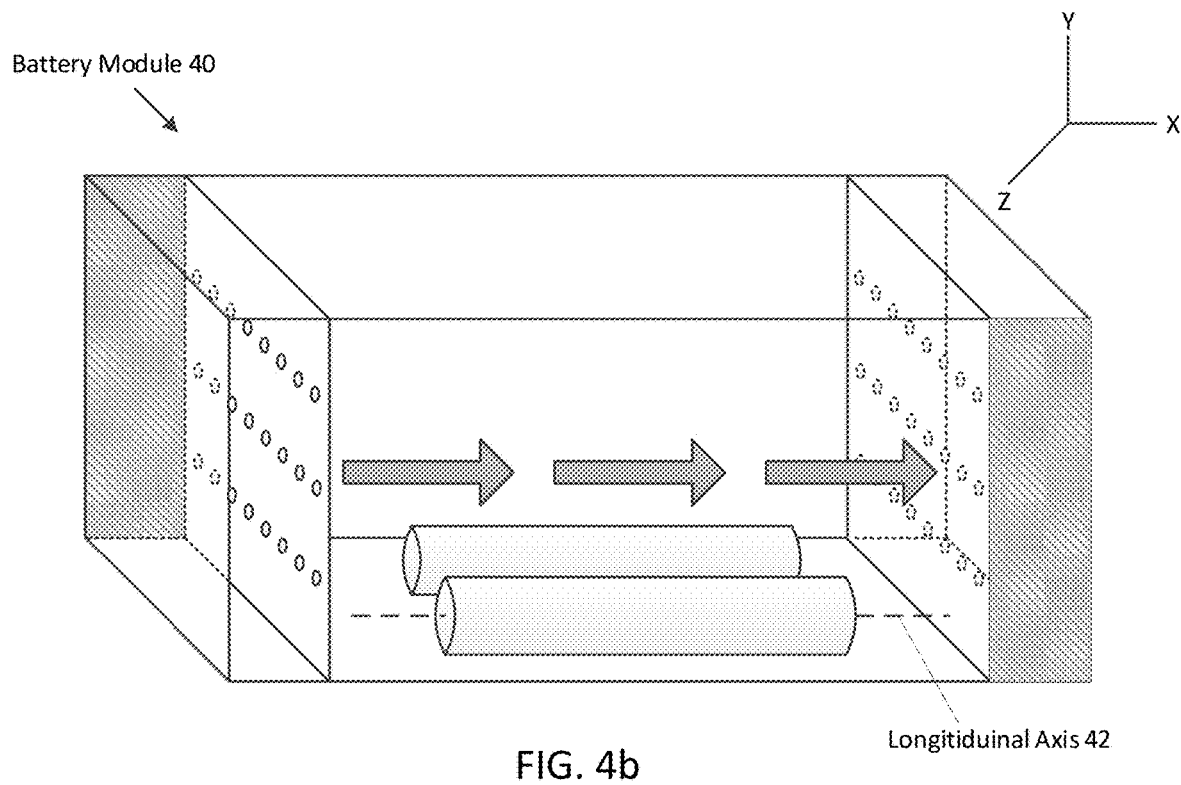

FIGS. 4a and 4b are block diagrams illustrating different examples of battery cell arrangements according to one embodiment. Specifically, both figures illustrate a perspective view of a battery module 40, where each figure has different arrangements of battery cells 41, which are cylindrical shaped cells. For example, FIG. 4a shows battery module 40 with two rows of three battery cells 41, where each of the cells is upright and has a longitudinal axis 42 that is parallel to the Y-axis. This arrangement may be considered a "cross-flow arrangement" since the air flow 43 that is flowing parallel to the X-axis is perpendicular to the longitudinal axes of the battery cells 41. FIG. 4b shows battery module 40 with two battery cells 41 that are laying down on a bottom of the module, where each of their longitudinal axes is parallel to the X-axis. This arrangement may be considered a "counter-flow arrangement" since the air flow 43 is flowing parallel to the longitudinal axes of the battery cells 41. In one embodiment, the battery cells 41 may be positioned such that a hotter side of the battery (such as a negative terminal of the battery) is closer to the air supply chamber 3.

Figure 5A:
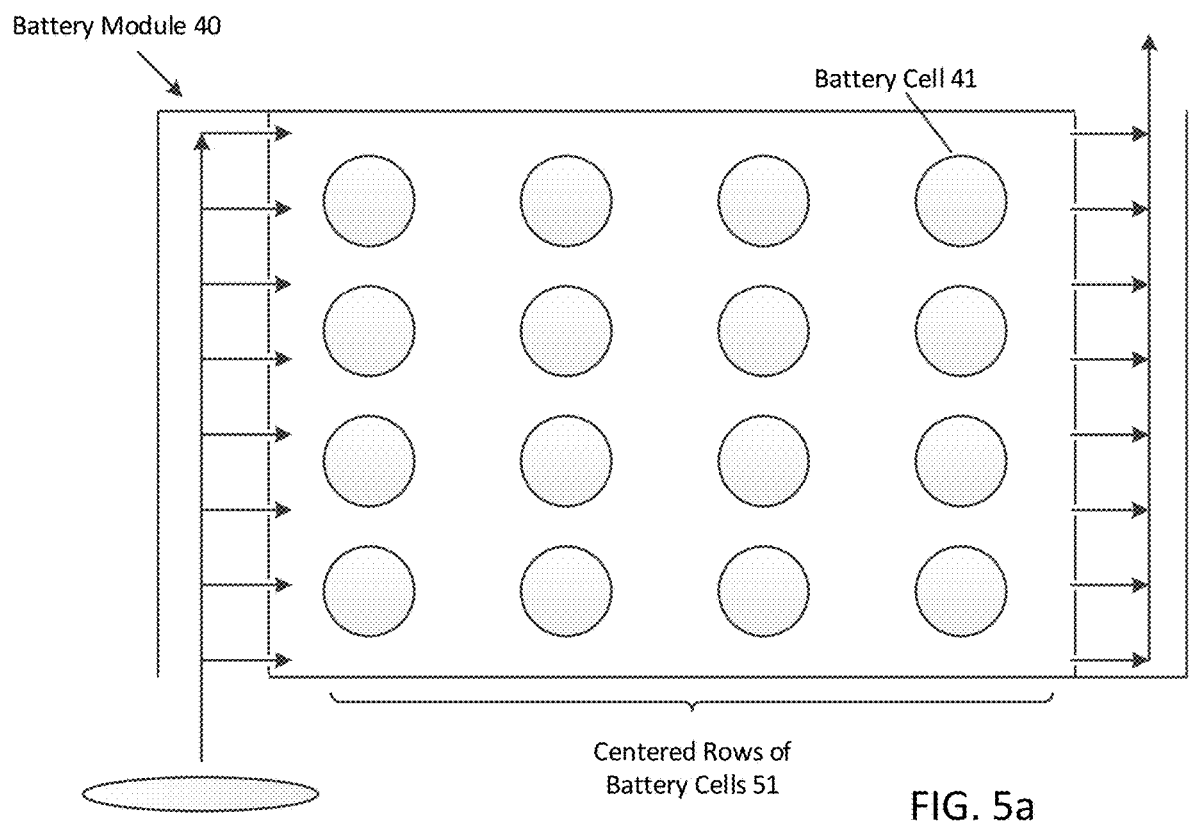
FIGS. 5a and 5b are block diagrams illustrating different examples of other battery cell arrangements according to one embodiment.
Figure 5B:
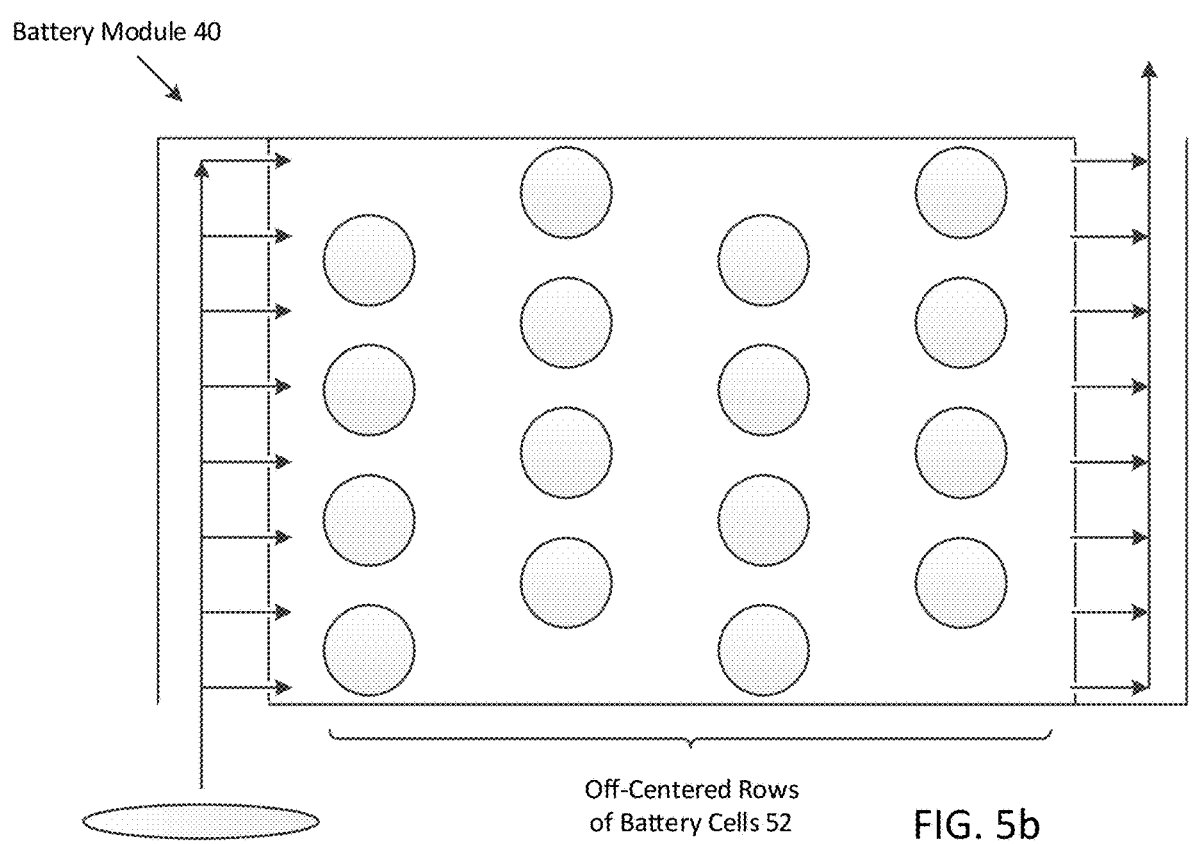

FIGS. 5a and 5b are block diagrams illustrating different examples of other battery cell arrangements according to one embodiment. Specifically, both figures illustrate a top-down cross-sectional view of the battery module 40 with four rows of battery cells that are in different arrangements, where each arrangement may affect air flow differently. For example, FIG. 5a shows battery module 40 with four rows of battery cells 51, where each row is centered with one another. In other words, this figure shows a 4×4 matrix of battery cells 41, where corresponding batteries in each row are centered (or aligned) with one another in a horizontal plane (and cells in each row are centered (or aligned) with one another in a vertical plane). FIG. 4b, on the other hand, shows battery module 40 with four rows of the battery cells 52, where adjacent rows are off-centered with one another. Specifically, corresponding batteries in adjacent rows are not aligned (or are off-centered) with one another in the horizontal plane. In one embodiment, the battery cell arrangement in FIG. 5a may promote more laminar air flow through the cell chamber 2 since the battery cells 41 are aligned in the horizontal plane, which is the same plane along which the cool air is supplied by the air supply chamber 3. In contrast, the battery cell arrangement in FIG. 5b may promote more turbulent air flow since the battery cells 41 of adjacent rows are not aligned in the horizontal plane, thereby causing air to collide with different cells more than in the arrangement of FIG. 5a. These additional collisions cause more diffraction/deflection of air, which results in an increase in turbulence.

In one embodiment, the battery module 40 may have any arrangement of battery cells. For instance, at least some of the rows may be centered with one another, while other rows are off-centered with one another.

Figure 6:
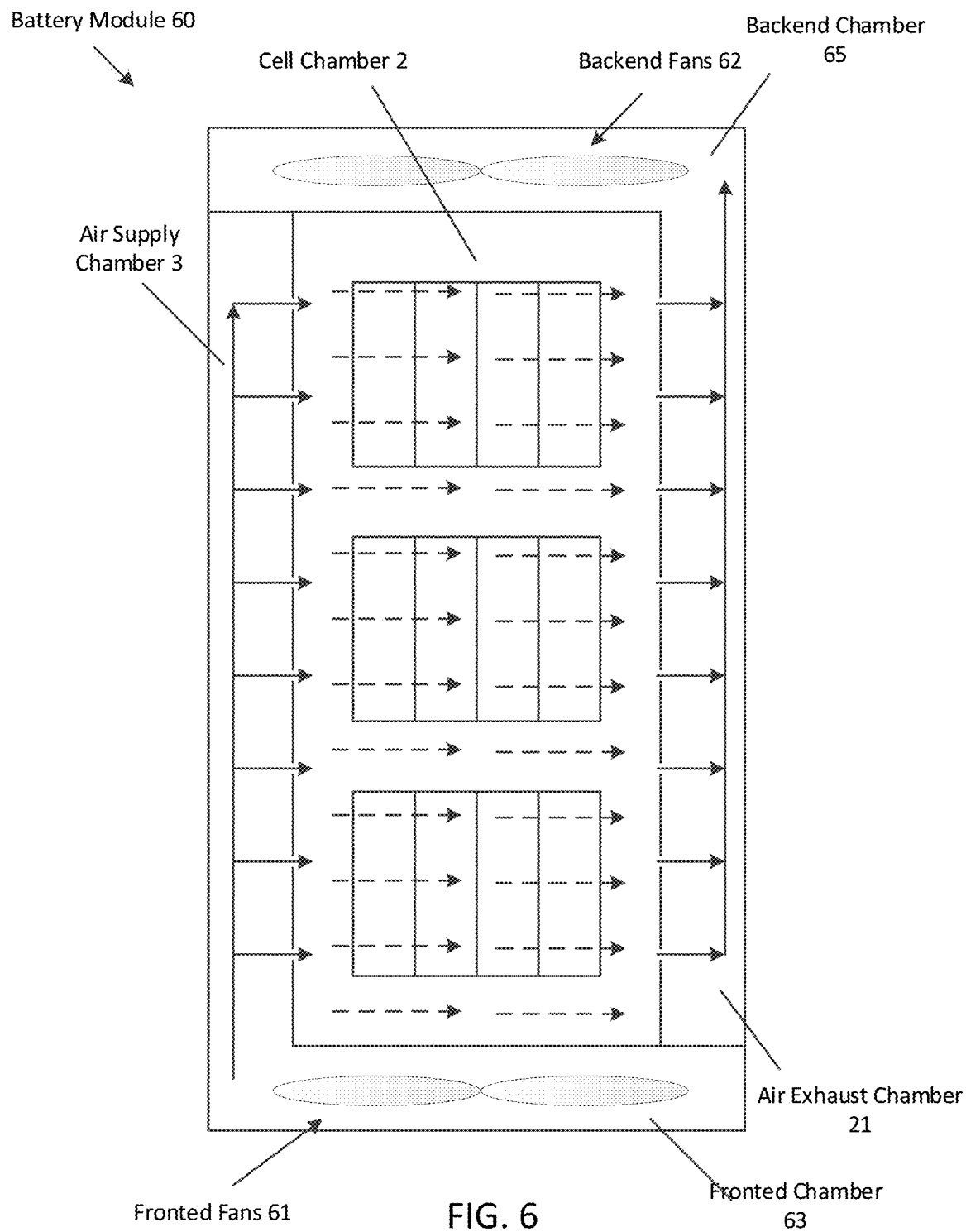
FIG. 6 is a block diagram illustrating an example of a battery module with fans that push cool air into the battery module and fans that pull air out of the battery module according to one embodiment.

FIG. 6 shows a block diagram illustrating an example of a battery module with fans that push cool air into the battery module and fans that pull air out of the battery module according to one embodiment. Specifically, this figure shows a battery module 60 with two pairs of fans. The first pair of fans are frontend fans 61 positioned at a frontend (or proximal) chamber 63 of the battery module 60 that is connected to the air supply chamber 3. In one embodiment, the frontend chamber may be a part of the air supply chamber 3. The fans 61 are configured to draw cool air (e.g., from outside the battery module 60) and supply the air throughout the rest of the air supply chamber, as described herein. In one embodiment, the frontend chamber 63 may have openings or perforations to allow cool air to enter the chamber (e.g., while the fans are operational).

Conversely, the second pair of fans are backend fans 62 positioned at a backend (or distal) chamber 65 of the battery module 60 that is connected to the air exhaust chamber 21. In one embodiment, the backend chamber may be a part of the air exhaust chamber. In one embodiment, the backend chamber may have openings or perforations to allow warmed air to exit the chamber and the battery module. The fans 62 are configured to pull the warmed air from the cell chamber, into the air exhaust chamber 21, and ultimately out of the battery module, as described herein. In one embodiment, there may be more or less of fans 61 and/or 62. In another embodiment, there may be a number of fans (e.g., two) that push cool air into the battery module, and there may be another number of fans (e.g., three) that pull warmed air out of the cell chamber.

Figure 7:
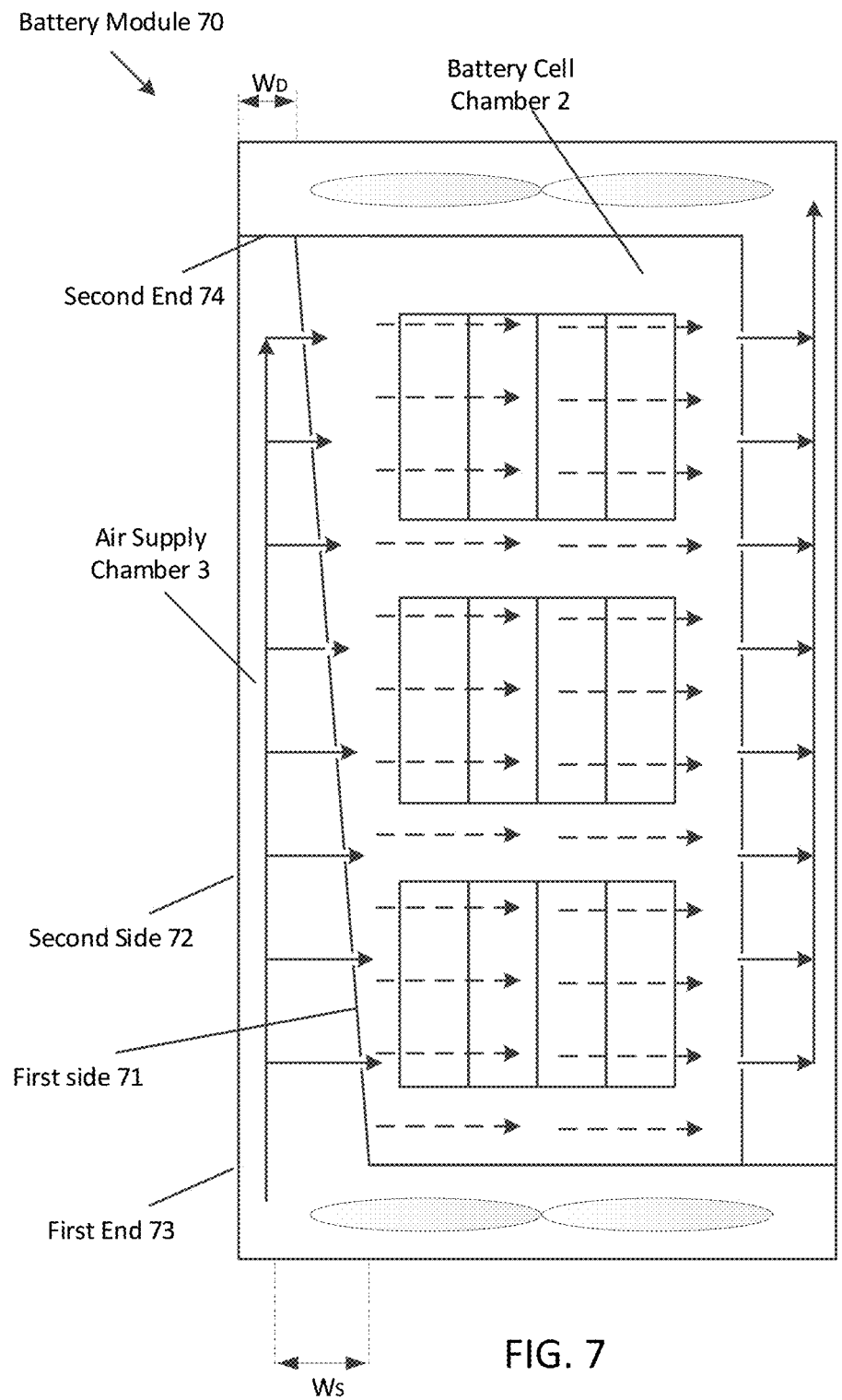
FIG. 7 is a block diagram illustrating another example of a battery module according to one embodiment.

FIG. 7 shows a block diagram illustrating another example of a battery module according to one embodiment. Specifically, this figure shows a battery module 70 with a tapering air supply chamber 3. In one embodiment, the air supply chamber 3 is tapered so that the cool air is distributed more evenly into the cell chamber (e.g., where the cool air enters the cell chamber from the air supply chamber with a uniform airflow rate). As illustrated, the chamber 3 has a first (proximal) end 73 near (or at) which one or more fans (e.g., fans 61) are located. This proximal end has an opening (e.g., opening 11) through which cool air produced by the fans enters the chamber, as described herein. Opposite to the proximal end is a second (distal) end 74 of the chamber 3 that is closed. A first side 71, which is adjacent to the cell chamber 2, tapers away from the cell chamber and towards a second side 72 of the air supply chamber 3 that is not adjacent to the cell chamber. The chamber tapers so that a width of the first end 73, which may be a same (or similar) width of the opening 11 $W_S$, is greater than a width, $W_D$, of the distal end 74.

Figure 8:
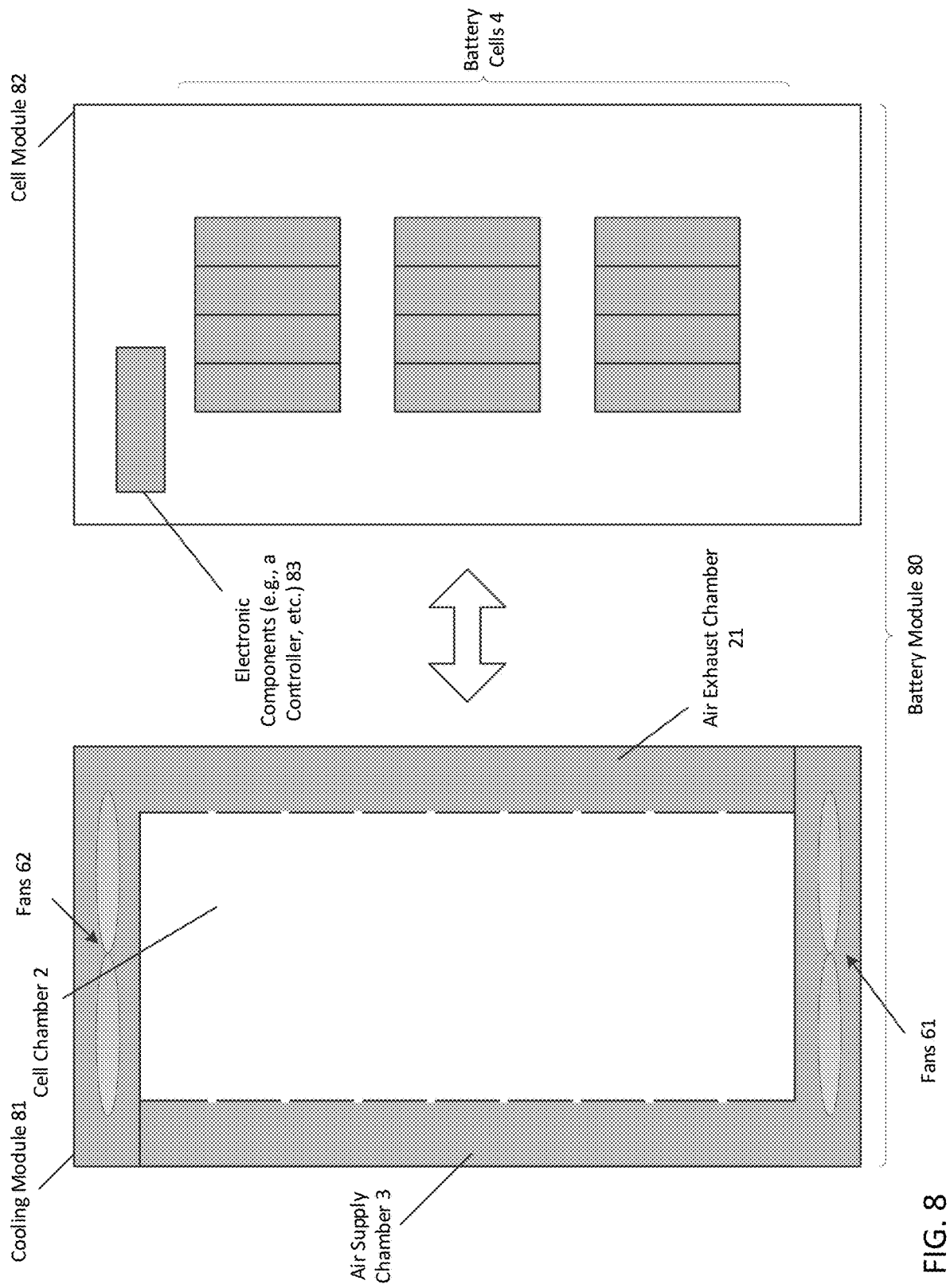
FIG. 8 is a block diagram illustrating an example of a modularized battery module according to one embodiment.

FIG. 8 shows a block diagram illustrating an example of a modularized battery module according to one embodiment. This figure shows a battery module 80 that is separated into two parts: a cooling module 81 and a cell module 82. Specifically, a bottom view of the cooling module 81 is shown, and a top view of the cell module 82 is shown. The cooling module includes the air cooling chamber 3, the fans 61 that push cool air into the module, the cell chamber 2, the air exhaust chamber 21, and the fans 62 that pull warmed air out of the module. The cell module includes the battery cells 4 and electronic components (e.g., a controller) 83 that are configured to control the operation of the battery module, such as managing airflow of fans 61 and/or 62.

In one embodiment, the cooling module 81 is removeably coupled to the cell module 82 to create a battery module. In particular, a bottom of the cooling module 81 is placed on top of the cell module 82. Thus in this figure, the cooling module 81 may be rotated about a centered longitudinal axis that runs from front to back of the cooling module 81 180° and positioned squarely on the cell module 82. In one embodiment, the cell module 82 and/or the cooling module 81 may have connections or latches that are configured to secure both modules together. Thus, when the cooling module 81 is on top of the cell module, the battery cells and/or the electronics 83 are enclosed within the cell chamber 2 of the cooling module 81.

As described herein, the electronic components 83 may include a controller, such as a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). In one embodiment, the controller may be a circuit with a combination of analog elements (e.g., resistors, capacitors, inductors, etc.) and/or digital elements (e.g., logic-based elements, such as transistors, etc.). The controller may also include memory. In one embodiment, the controller may perform airflow management operations, such as controlling a speed at which any of the fans (e.g., fans 61 and/or fans 62) rotate in order to adjust the air flow within the battery module. Thus, the controller may be communicatively coupled (e.g., wired) to any of the fans. In another embodiment, the electronic components 83 may include a temperature sensor (e.g., a thermocouple, a resistance temperature detector (RTD), etc.) that is configured to detect the temperature within the cell chamber. The controller may be configured to adjust the speed of the fans based on the temperature (e.g., the hotter the cell chamber, the faster the controller causes the fans to rotate).

In one embodiment, any of the battery modules described herein may include more or less components, as described herein. As one example, a battery module (e.g., module 10) may include an output connector (one anode and one cathode) that is coupled to the battery cells 4 and is configured to be removeably coupled to a load (e.g., the load may be at least one server) in order for the battery module to provide battery energy stored within the cells to the load via the output connector. Similarly, the connector may be configured to be removeably coupled to an external power supply in order for the battery module to draw power from the supply via the connector. In another example, the battery module 10 may include components to help transfer heat from the battery cells. For instance, a heatsink may be placed upon (e.g., on top of) the battery cells in order to efficiently draw heat away from the cells while discharging and/or charging. As another example, the module may include an air baffle that is configured to direct air flow towards the cells.

As described above, a BBU can be utilized as a backup power supply unit in an electronic rack of a data center. An electronic rack includes an array of server blades, each including a computer server for data processing. The electronic rack further includes a power supply to provide power to the server blades and a BBU to provide backup power to the server blades when the power supply is unavailable.

Figure 9:
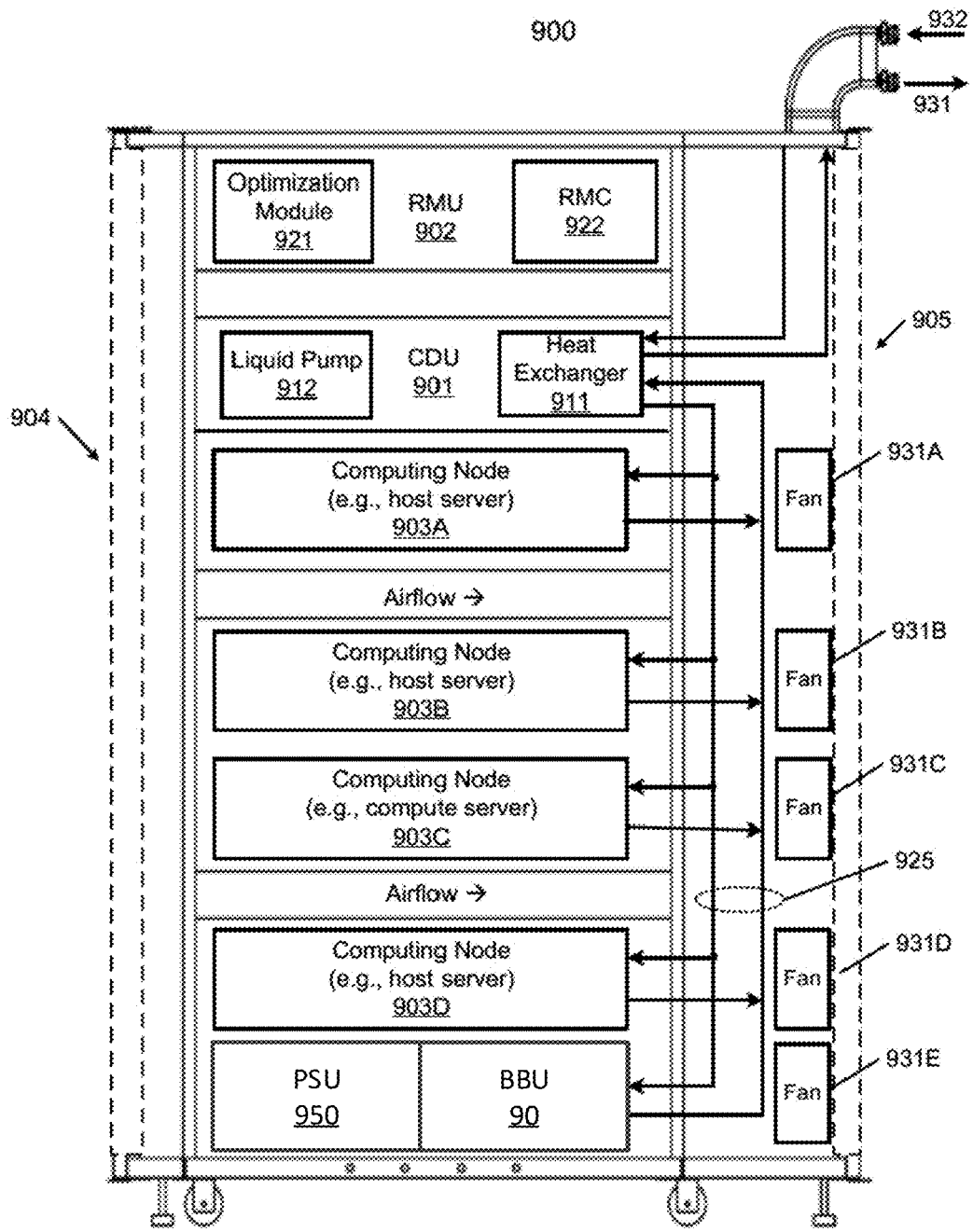
FIG. 9 shows an example of an electronic rack containing a battery backup unit (BBU) according to one embodiment.

FIG. 9 is a block diagram illustrating an example of an electronic rack according to one embodiment. Electronic rack 900 may include one or more server slots to contain one or more servers respectively. Each server includes one or more information technology (IT) components (e.g., processors, memory, storage devices, network interfaces). According to one embodiment, electronic rack 900 includes, but is not limited to, CDU 901, rack management unit (RMU) 902 (optional), a power supply unit (PSU) 950, the BBU 90 (which may include one or more battery modules as described herein) and one or more server blades 903A-903D (collectively referred to as server blades 903). Server blades 903 can be inserted into an array of server slots respectively from frontend 904 or backend 905 of electronic rack 900. The PSU 950 and/or BBU 90 may be inserted into any of server slots 903 within the electronic rack 900. In one embodiment, one or more BBUs may be inserted into any of server slots 903 within the electronic rack 900.

Note that although there are only four server blades 903A-903D shown here, more or fewer server blades may be maintained within electronic rack 900. Also note that the particular positions of CDU 901, RMU 902, PSU 950, BBU 910, and server blades 903 are shown for the purpose of illustration only; other arrangements or configurations of CDU 901, RMU 902, BBU 90, and server blades 903 may also be implemented. Note that electronic rack 900 can be either open to the environment or partially contained by a rack container, as long as the cooling fans can generate airflows from the frontend to the backend.

In addition, a fan module can be associated with each of the server blades 903, and the BBU 90. In this embodiment, fan modules 931A-931E, collectively referred to as fan modules 931, and are associated with server blades 903A-903D, respectively. Each of the fan modules 931 includes one or more cooling fans. Fan modules 931 may be mounted on the backends of server blades 903 and BBU 90 to generate airflows flowing from frontend 904, traveling through the air space of the sever blades 903, and existing at backend 905 of electronic rack 900. In one embodiment, each of the fan modules may be mounted on the backends of the server blades 903 and one or more BBU 90. For example, a fan module (e.g., 931E) may pull the warmed air 23 into the air exhaust chamber 21 of a battery module (e.g., module 20) of the BBU 90 and expel the air out of the module and the BBU. In another embodiment, one or more of the fan modules may be positioned on the frontend 904 of the rack 900. Such frontend fans may be configured to push air into the server blades 903 and/or the BBU 90.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid supply/return lines 931-932 to form a primary loop. The connectors coupled to the external liquid supply/return lines 931-932 may be disposed or mounted on backend 905 of electronic rack 900. The liquid supply/return lines 931-932 are coupled to a set of room manifolds, which are coupled to an external heat removal system, or external cooling loop. In addition, heat exchanger 911 further includes a second loop with two ports having a second pair of liquid connectors coupled to liquid manifold 925 to form a secondary loop, which may include a supply manifold to supply cooling liquid to server blades 903 and a return manifold to return warmer liquid back to CDU 901. Note that CDUs 901 can be any kind of CDUs commercially available or customized ones. Thus, the details of CDUs 901 will not be described herein.

Each of server blades 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. Server blades 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 900 further includes optional RMU 902 configured to provide and manage power supplied to servers 903, fan modules 931, and CDU 901. Optimization module 921 and RMC 922 can communicate with a controller in some of the applications. RMU 902 may be coupled to PSU 950 to manage the power consumption of the PSU. The PSU 950 may include the necessary circuitry (e.g., an alternating current (AC) to direct current (DC) or DC to DC power converter, backup battery, transformer, or regulator, etc.) to provide power to the rest of the components of electronic rack 900.

In one embodiment, RMU 902 includes optimization module 921 and rack management controller (RMC) 922. RMC 922 may include a monitor to monitor operating status of various components within electronic rack 900, such as, for example, computing nodes 903, CDU 901, and fan modules 931. Specifically, the monitor receives operating data from various sensors representing the operating environments of electronic rack 900. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Once the optimal pump speed and optimal fan speeds have been determined, RMC 922 configures liquid pump 912 and cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance are adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds.

Note that some or all of the IT components of servers 903 (e.g., 903A, 903B, 903C, and/or 903D) may be attached to any one of the cooling devices described above, either via air cooling using a heatsink or via liquid cooling using a cold plate. One server may utilize air cooling while another server may utilize liquid cooling. Alternatively, one IT component of a server may utilize air cooling while another IT component of the same server may utilize liquid cooling. In addition, a switch is not shown here, which can be either air cooled or liquid cooled.

Figure 10:
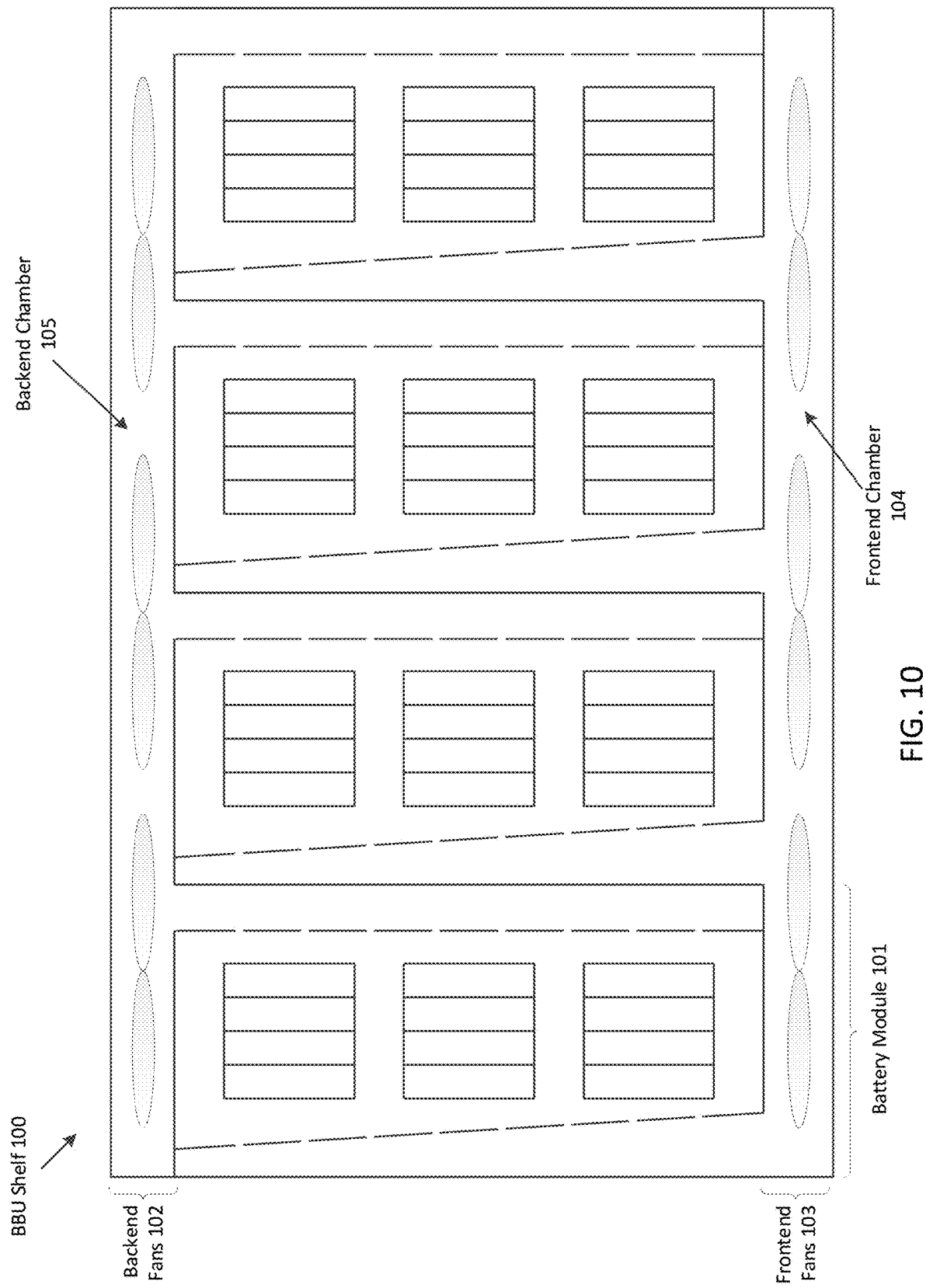
FIG. 10 shows an example of a BBU shelf with several battery modules according to one embodiment.

FIG. 10 is an example of a BBU shelf with several battery modules populated therein according to one embodiment. In one embodiment, the BBU shelf comprises one or more battery modules and is configured to be inserted into any of the server slots 903 within the electronic rack 900. In some embodiments, the BBU shelf may perform similar operations as the BBU 90. For example, the BBU shelf may be coupled to one or more server blades of the rack in order to provide backup power. This figure shows BBU shelf 100 that includes four battery modules 101, one or more backend fans 102 that are in a backend chamber 105, and one or more front fans 103 that are in a frontend chamber 104. Each battery module 101 includes a tapered air supply chamber 3 that share the frontend chamber 104 and an air exhaust chamber 21 that shares the backend chamber 105. In this design, the frontend fans 103 are configured to push air into each battery module's air supply chamber in order to supply cool air into the module's cell chamber. In addition, the backend fans 102 are configured to pull warmed air from each battery module's cell chamber into the module's air exhaust chamber in order to expel the warmed air out of the module and the BBU shelf 100.

Figure 11:
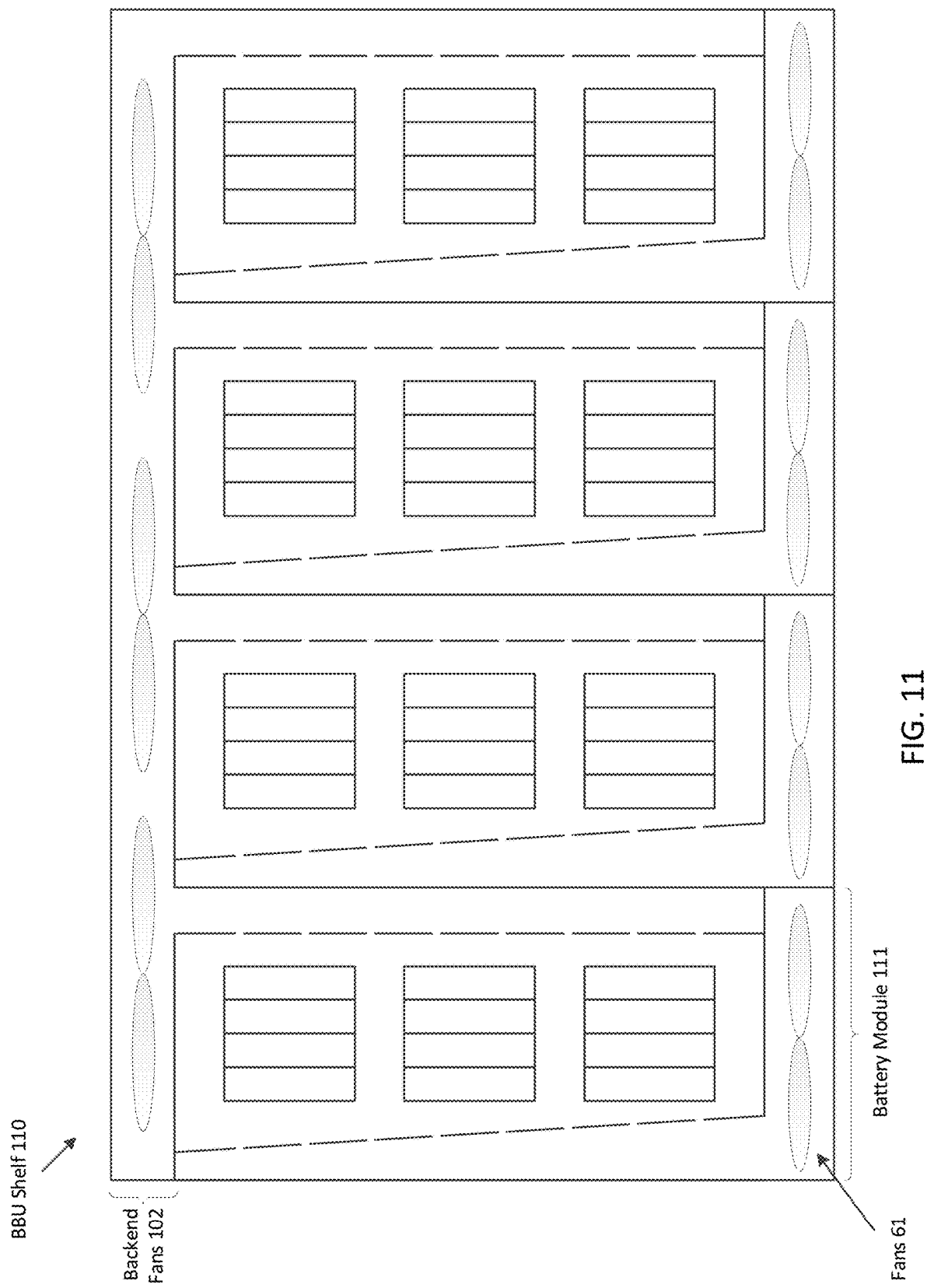
FIG. 11 shows another example of a BBU shelf with several battery modules according to one embodiment.

FIG. 11 is another example of a BBU shelf with several battery modules according to one embodiment. Specifically, this figure includes a BBU shelf 110 that is similar to the BBU shelf 100 of FIG. 10 except that BBU shelf 110 includes battery modules 111 that have separate individual frontend fans 61. Thus, in this example, each battery module includes one or more fans that are configured to push cool air into the air supply chamber, as described herein. Similar to shelf 100, however, BBU shelf 110 includes the backend fans 102 that are configured to pull warmed air from each of the battery module's cell chambers, as described herein. In one embodiment, the modules of shelf 110 may share front end fans (as illustrated in FIG. 10) but have individualized backend fans (e.g., fans 62).

In one embodiment, the battery modules are removeably coupled to either BBU shelf such that modules may be added/removed from the shelf. In another embodiment, the BBU shelf may include a controller that is configured to perform airflow management operations, as described herein. For example, the controller may adjust the fan speed of any of the frontend or backend fans. In some embodiments, any of the battery modules described herein may be added to either of the BBU shelfs.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

As previously explained, an embodiment of the disclosure may be (or include) a non-transitory machine-readable medium (such as microelectronic memory) having stored thereon instructions, which program one or more data processing components (generically referred to here as a "processor") to perform airflow management operations, such as controlling fan speed of one or more fans of the battery module (and/or BBU shelf). In other embodiments, some of these operations might be performed by specific hardware components that contain hardwired logic. Those operations might alternatively be performed by any combination of programmed data processing components and fixed hardwired circuit components of any of the battery modules described herein.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A battery backup unit (BBU) shelf of an electronic rack that comprises a plurality of server blades, each server blade including one or more servers to provide data processing services, wherein the BBU shelf is coupled to the server blades and is configured to provide backup power, wherein the BBU shelf comprises:
one or more battery modules, each battery module comprising:
a battery cell chamber that includes a set of battery cells configured to provide battery energy as the backup power and are configured to draw power from an external power supply to charge the battery cells;
an air supply chamber that is configured to supply air into the battery cell chamber, wherein the supplied air flows through the battery cell chamber and absorbs heat generated by the battery cells to produce warmed air; and
a plurality of apertures, through which the air is supplied from the air supply chamber and into the battery cell chamber.

2. The BBU shelf of claim 1, wherein each battery module further comprises at least one fan that is configured to push the air into the air supply chamber to supply the air into the battery cell chamber.

3. The BBU shelf of claim 2, wherein, for each battery module,
the air supply chamber comprises an opening through which air is pushed into the air supply chamber by the at least one fan, wherein the opening has a first width and each of the apertures has a second width that is less than the first width, wherein the plurality of apertures are configured to supply the air at a higher air flow rate than an air flow rate at which the at least one fan pushes the air through the opening.

4. The BBU shelf of claim 1, wherein each battery module further comprises an air exhaust chamber that is configured to receive the warmed air from the battery cell chamber.

5. The BBU shelf of claim 4 further comprises at least one of 1) at least one fan that is configured to push the air into the air supply chamber of each battery module to supply the air into the battery cell chamber of each battery module and 2) at least one fan that is configured to pull the warmed air from the battery cell chamber of each battery module into the air exhaust chamber of each battery module in order to expel the warmed air.

6. The BBU shelf of claim 4, wherein each battery module further comprises at least one fan that is configured to push the air into the air supply chamber to supply the air into the battery cell chamber, wherein the BBU shelf further comprises at least one fan that is configured to pull the warmed air from the battery cell chamber of each battery module into the air exhaust chamber of each battery module in order to expel the warmed air.

7. The BBU shelf of claim 4, wherein for each battery module
the air supply chamber is on a first side of the battery cell chamber and the air exhaust chamber is on a second side that is opposite of the first side, or
the battery cell chamber is on top of the air supply chamber and the air exhaust chamber is on top of the battery cell chamber.

8. An electronic rack, comprising:
a plurality of server blades, each server blade including one or more servers to provide data processing services;
a power supply unit coupled to the server blades to provide power to the server blades; and
a battery backup unit (BBU) shelf to provide backup power to the server blades when the power supply is unavailable, wherein the BBU shelf comprises:
one or more battery modules, each battery module comprising:
a battery cell chamber that includes a set of battery cells configured to provide battery energy as the backup power and are configured to draw power from an external power supply to charge the battery cells,
an air supply chamber that is configured to supply air into the battery cell chamber, wherein the supplied air flows through the battery cell chamber and absorbs heat generated by the battery cells to produce warmed air, and
a plurality of apertures, through which the air is supplied from the air supply chamber and into the battery cell chamber.

9. The electronic rack of claim 8, wherein each battery module further comprises at least one fan that is configured to push the air into the air supply chamber to supply the air into the battery cell chamber.

10. The electronic rack of claim 9, wherein, for each battery module the at least one fan is at a first end of the air supply chamber,
the air supply chamber comprises a first side that is adjacent to the battery cell chamber and a second side that is not adjacent to the battery cell chamber, and
the first side of the air supply chamber tapers away from the battery cell chamber and towards the second side of the air supply chamber so that a width of the first end is greater than a width of the second end.

11. The electronic rack of claim 9, for each battery module, the air supply chamber comprises an opening through which air is pushed into the air supply chamber by the at least one fan, wherein the opening has a first width and each of the apertures has a second width that is less than the first width, wherein the plurality of apertures are configured to supply the air at a higher air flow rate than an air flow rate at which the at least one fan pushes the air through the opening.

12. The electronic rack of claim 8, wherein each battery module further comprises an air exhaust chamber that is configured to receive the warmed air from the battery cell chamber.

13. The electronic rack of claim 12, wherein the BBU shelf further comprises at least one of 1) at least one fan that is configured to push the air into the air supply chamber of each battery module to supply the air into the battery cell chamber of each battery module and 2) at least one fan that is configured to pull the warmed air from the battery cell chamber of each battery module into the air exhaust chamber of each battery module in order to expel the warmed air.

14. The electronic rack of claim 12, wherein each battery module further comprises at least one fan that is configured to push the air into the air supply chamber to supply the air into the battery cell chamber, wherein the BBU shelf further comprises at least one fan that is configured to pull the warmed air from the battery cell chamber of each battery module into the air exhaust chamber of each battery module in order to expel the warmed air.

15. The electronic rack of claim 12, wherein for each battery module
the air supply chamber is on a first side of the battery cell chamber and the air exhaust chamber is on a second side that is opposite of the first side, or
the battery cell chamber is on top of the air supply chamber and the air exhaust chamber is on top of the battery cell chamber.

16. The electronic rack of claim 8, wherein the set of battery cells comprises a first row of one or more battery cells and a second row of one or more battery cells, wherein the first and second rows are one of 1) centered with one another or 2) off-centered with one another.

17. The electronic rack of claim 8, wherein at least one battery module comprises 1) a cooling module that includes the battery cell chamber and the air supply chamber and 2) a cell module that includes the set of battery cells, wherein the cooling module is removeably coupled to the cell module, wherein the set of battery cells are enclosed within the battery cell chamber when the cooling module is coupled to the cell module.

18. The BBU shelf of claim 1, wherein the set of battery cells comprises a first row of one or more battery cells and a second row of one or more battery cells, wherein the first and second rows are one of 1) centered with one another or 2) off-centered with one another.

19. The BBU shelf of claim 1, wherein at least one battery module comprises 1) a cooling module that includes the battery cell chamber and the air supply chamber and 2) a cell module that includes the set of battery cells, wherein the cooling module is removeably coupled to the cell module, wherein the set of battery cells are enclosed within the battery cell chamber when the cooling module is coupled to the cell module.

20. A battery backup unit (BBU) shelf for providing backup power for an electronic rack, the BBU shelf comprising:
one or more battery modules, each battery module comprising:
a battery cell chamber that includes a set of one or more battery cells for providing battery energy as the backup power;
an air supply chamber that is configured to supply air into the battery cell chamber, wherein the supplied air flows through the battery cell chamber and absorbs heat generated by the battery cells to produce warmer air than the supplied air; and
a fan that is at a first end of the air supply chamber and is for pushing air into the air supply chamber,
wherein the air supply chamber comprises a first side that is adjacent to the battery cell chamber and a second side that is not adjacent to the battery cell chamber,
wherein the first side of the air supply chamber tapers away from the battery cell chamber and towards the second side of the air supply chamber so that a width of the first end is greater than a width of a second end of the air supply chamber that is opposite to the first end.

* * * * *